2,752,263
Patented June 26, 1956

2,752,263

ADHESIVE COMPOSITION

Stanley W. Pierce, Glen Ellyn, Ill., assignor to American Can Company, New York, N. Y., a corporation of New Jersey No Drawing. Application March 3, 1952, Serial No. 274,674

4 Claims. (Cl. 106—230)

This invention relates to a laminating adhesive for cellulosic materials and more particularly refers to a composition comprising a microcrystalline wax, paraffin, asphalt and a rosin ester.

An object of the invention is the provision of a laminating composition having excellent adhesive properties and a low moisture vapor transmission rate.

Another object is the provision of a laminating composition which is flexible and pliable at room temperature and which can withstand creasing or folding without rupture or cracking.

Numerous other objects and advantages of the invention will be apparent as it is better understood from the following description which is of a preferred embodiment thereof.

The compounds of my invention are useful for laminating a wide variety of sheet materials, and they are especially useful for laminating cellulosic materials such as kraft paper, glassine, parchment, regenerated cellulose, cellulose esters and the like.

The laminated strips may be used for numerous purposes, including container manufacture. The containers made from these laminated materials must often meet rigid specifications of grease or liquid-proofness and they may also be required to have a low water vapor transmission rate. To make laminated sheets that are either grease-proof or liquid-proof is in most instances a relatively simple matter. There are many sheet materials that are known to be resistant to fatty materials or liquids or both. A much more difficult situation presents itself when an attempt is made to add the property of low water vapor transfer to a laminated cellulosic sheet. Most materials which hold liquid or grease will permit ready passage, diffusion or transfer of water vapors. Thus, with the exception of laminates of metallic foils or a very limited number of expensive synthetic plastics, such as polyethylene, sheet materials alone are not effective barriers against water vapor passage. In order to use relatively inexpensive vapor pervious stock, such, for example, as paper board to which is laminated a sheet of glassine and still provide low water vapor transfer, a thin layer of adhesive must serve the double function of bonding the several plies and also of resisting passage of water vapor. The adhesive, additionally, must be easy to spread uniformly over the entire surface of a web, it must be flexible and strong under conditions of container manufacture, handling and storage, so as to avoid fractures and uncoated areas, and it must adhere well to both surfaces undergoing a bonding process. In instances where a water vapor resistant plastic sheet is employed, its water vapor imperviousness can be further increased by use of my adhesive as a laminating agent.

After experimenting with a wide variety of materials, I found that an adhesive having low water vapor transfer rates when applied in thin layers can be made by blending from about 17 to 19 per cent of microcrystalline wax, about 16 to 17 per cent of paraffin, from about 31 to 33.5 per cent of asphalt and about 31 to 32 per cent of a glycerol ester of rosin or hydrogenated rosin. The percentages disclosed herein are all by weight based on the finished adhesive. A small amount, up to 1 per cent by weight of adhesive, of a methyl ester of rosin or hydrogenated rosin is desirable to improve the spreading characteristics of the adhesives, but it is not essential to a successful composition.

The following formulae are exemplary of my adhesive:

| Ingredient | Percent by Weight | |
| --- | --- | --- |
|  | 1 | 2 |
| Paraffin | 16.5 | 16.7 |
| Asphalt | 33.5 | 31.3 |
| Glycerol ester of hydrogenated rosin | 32.0 | 32.0 |
| Microcrystalline Wax | 17.0 | 19.0 |
| Methyl ester of hydrogenated rosin | 1.0 | 1.0 |
|  | 100.0 | 100.0 |

The preferred paraffin has a 128/30 A. M. P., but one having a melting point of as low as about 120° F. or as high as 140° F. is equally satisfactory.

The asphalt is a tarry residue of petroleum distillation. A typical example is sold under the trade name of Korite #1 by the Standard Oil Company of Indiana.

Microcrystalline wax is also a petroleum distillation residue. It is composed of a mixture of hydrocarbons and has a very fine crystalline structure at room temperatures. The grades that are most suitable for my purpose have melting points ranging from about 130° to 170° F.

A suitable glycerol ester of hydrogenated rosin is sold under the trade name "Staybelite Ester 10" and the methyl ester of hydrogenated rosin may be "Hercolyn." Both of the latter chemicals are products of the Hercules Powder Company.

The proportions of the various ingredients are quite critical in an adhesive having proper physical properties for laminating purposes. Thus, adhesiveness can be increased by using a higher proportion of asphalt, but this results in a product having too high a viscosity for use with the ordinary laminating machinery. The viscosity can be readily reduced by adding more paraffin, but any substantial increase above 17 per cent seriously affects adhesion. Without the glycerol ester of rosin, the asphalt, paraffin and microcrystalline wax are not sufficiently compatible to be useful. The rosin ester therefore, acts as a flux and keeps the ingredients from separating. A quantity of glycerol rosin ester considerably under 31 per cent has insufficient fluxing action to keep the adhesive ingredients uniformly distributed, and quantities much greater than 33.5 per cent impart a resinous characteristic to the adhesive which causes the bond to strip readily and fracture on bending at room temperature. The methyl ester of rosin improves the spreading properties of the adhesive, but if much more than 1 per cent is added it has a tendency to soften the adhesive excessively and to decrease its powers of adhesion.

The preferred method of making my adhesive is to melt the paraffin and microcrystalline wax in a heated kettle and add the glycerol ester of rosin. These ingredients are stirred about 10–15 minutes until a uniform mixture results. The asphalt is then added, with continued stirring, to effect an even dispersion or solution of all the constituents of the adhesive. At this stage the molten adhesive is ready for use or it can be poured into molds or containers for storage.

The adhesive may also be made by first blending molten asphalt and glycerol rosin ester. The paraffin and microcrystalline wax can then be added to the asphalt glycerol rosin ester mixture and stirred until the composition attains uniformity.

Containers for packaging products that are moderately hygroscopic, such as table salt, have been made successfully using the adhesive of this invention as a laminating agent for an outer layer of kraft board and an inner layer of glassine. Packaged samples of salt and other moisture absorbing products were held at a relatively high humidity without caking. The same types of containers protected moisture-bearing products against excessive water losses when the packed containers were stored at room temperature and a relatively low humidity.

It is thought that the invention and many of its attendant advantages will be understood from the foregoing description, and it will be apparent that various changes may be made in the matter of the ingredients, their identity and their proportions without departing from the spirit and scope of the invention or sacrificing all of its material advantages, the form hereinbefore described being merely a preferred embodiment thereof.

I claim:

1. A laminating adhesive composition for cellulosic material comprising from about 16 to 17 per cent by weight of paraffin wax from about 17 to 19 per cent by weight of microcrystalline wax, from about 31 to 33.5 per cent by weight of asphalt, and from about 31 to 32 per cent by weight of a glycerol ester of a material selected from the class consisting of rosin and hydrogenated rosin, said percentages being based on the weight of the finished adhesive.

2. A laminating adhesive composition for cellulosic material consisting of from about 16 to 17 per cent by weight of paraffin wax, from about 17 to 19 per cent by weight of microcrystalline wax, from about 31 to 33.5 per cent by weight of asphalt, from about 31 to 32 per cent by weight of a glycerol ester of a material selected from the class consisting of rosin and hydrogenated rosin and up to about one per cent by weight of a methyl ester of a material selected from the class consisting of rosin and hydrogenated rosin; said percentages being based on the weight of the finished adhesive.

3. A laminating adhesive composition for cellulosic material consisting of about 16.5 per cent by weight of paraffin wax, about 18 per cent by weight of microcrystalline wax, about 32 per cent by weight of asphalt, about 32.5 per cent by weight of a glycerol ester of hydrogenated rosin, and about 1 per cent by weight of a methyl ester of hydrogenated rosin, said percentages being based on the weight of the finished adhesive.

4. A laminating adhesive composition for cellulosic material consisting of about 16.5 per cent by weight of paraffin wax, about 18 per cent by weight of microcrystalline wax, about 33 per cent by weight of asphalt, about 31.5 per cent by weight of a glycerol ester of hydrogenated rosin and about 1 per cent by weight of a methyl ester of hydrogenated rosin, said percentages being based on the weight of the finished adhesive.

References Cited in the file of this patent

UNITED STATES PATENTS

| | | |
|---|---|---|
| 2,397,805 | Ott | Apr. 2, 1946 |
| 2,443,221 | Bergstein | June 15, 1948 |
| 2,599,130 | Rumberger et al. | June 3, 1952 |
| 2,641,551 | Smith et al. | June 9, 1953 |
| 2,649,384 | Anderson | Aug. 18, 1953 |

OTHER REFERENCES

"The Technology of Adhesives," Del Monte, Reinhold Publishing Corp., New York, N. Y., 1947, pages 293 and 294.